United States Patent
Akiya et al.

(10) Patent No.: US 9,497,107 B1
(45) Date of Patent: Nov. 15, 2016

(54) SEAMLESS PATH MONITORING AND RAPID FAULT ISOLATION USING BIDIRECTIONAL FORWARDING DETECTION IN A NETWORK ENVIRONMENT

(71) Applicant: CISCO TECHNOLOGY, INC., San Jose, CA (US)

(72) Inventors: Nobushige Akiya, Kanata (CA); David D. Ward, Los Gatos, CA (US); Carlos M. Pignataro, Raleigh, NC (US); Nagendra Kumar Nainar, Durham, NC (US); Tarek Saad, Nepean (CA); Muthurajah Sivabalan, Kanata (CA)

(73) Assignee: CISCO TECHNOLOGY, INC., San Jose, CA (US)

( * ) Notice: Subject to any disclaimer, the term of this patent is extended or adjusted under 35 U.S.C. 154(b) by 389 days.

(21) Appl. No.: 14/211,710

(22) Filed: Mar. 14, 2014

Related U.S. Application Data

(60) Provisional application No. 61/831,943, filed on Jun. 6, 2013, provisional application No. 61/838,951, filed on Jun. 25, 2013.

(51) Int. Cl.
*H04L 12/707* (2013.01)
(52) U.S. Cl.
CPC ................... *H04L 45/22* (2013.01)
(58) Field of Classification Search
None
See application file for complete search history.

(56) References Cited

U.S. PATENT DOCUMENTS

| | | | | |
|---|---|---|---|---|
| 7,561,527 B1* | 7/2009 | Katz | ................... | H04L 12/2697 370/241 |
| 7,742,400 B2* | 6/2010 | Liu | ..................... | H04L 12/4633 370/218 |
| 7,940,678 B2* | 5/2011 | Tan | ......................... | H04L 45/28 370/217 |
| 8,543,718 B2* | 9/2013 | Rahman | ................. | H04L 45/00 709/230 |
| 8,953,460 B1* | 2/2015 | Addepalli | ............... | H04L 43/10 370/241 |
| 9,331,923 B2* | 5/2016 | Li | ........................ | H04L 43/0823 |
| 2006/0133300 A1* | 6/2006 | Lee | ......................... | H04L 45/00 370/254 |
| 2007/0189177 A1* | 8/2007 | Zhai | ........................ | H04L 45/10 370/244 |
| 2009/0279440 A1* | 11/2009 | Wong | .................. | H04L 41/0631 370/242 |
| 2009/0279441 A1* | 11/2009 | Wong | .................. | H04L 41/0631 370/242 |

(Continued)

OTHER PUBLICATIONS

"Seamless Bidirectional Forwarding Detection (S-BFD) draft-ietf-bfd-seamless-base-00", IETF, Dec. 14, 2014.*

(Continued)

*Primary Examiner* — Phirin Sam
*Assistant Examiner* — Faiyazkhan Ghafoerkhan
(74) *Attorney, Agent, or Firm* — Patent Capital Group

(57) ABSTRACT

An example method for seamless path monitoring and rapid fault isolation using bidirectional forwarding detection (BFD) in a network environment is provided and includes determining a BFD target identifier type for communicating in a BFD session in a network environment, determining a non-zero globally assigned BFD discriminator value associated with the BFD target identifier type, populating a Your Discriminator field in a BFD Control Packet with the non-zero globally assigned BFD discriminator value, with a My Discriminator field in the BFD Control Packet being populated with a locally assigned BFD Discriminator value, and initiating the BFD session by transmitting the BFD Control Packet to a target node in the network. In a specific embodiment, the BFD target identifier type is type 3, and the non-zero globally assigned BFD discriminator is an Alert Discriminator reserved by substantially all nodes in the network exclusively for BFD traceroute operations.

20 Claims, 11 Drawing Sheets

(56) References Cited

U.S. PATENT DOCUMENTS

| | | | |
|---|---|---|---|
| 2010/0149992 A1* | 6/2010 | Tan | H04L 45/28 370/242 |
| 2010/0290345 A1* | 11/2010 | Gero | H04L 43/0811 370/241.1 |
| 2011/0202670 A1* | 8/2011 | Zheng | H04L 47/2483 709/228 |
| 2011/0280134 A1* | 11/2011 | Zheng | H04L 43/0811 370/241 |
| 2013/0003562 A1* | 1/2013 | Xu | H04L 41/12 370/242 |
| 2013/0028099 A1* | 1/2013 | Birajdar | H04L 45/28 370/242 |
| 2013/0070764 A1* | 3/2013 | Boutros | H04L 49/351 370/390 |
| 2013/0229922 A1* | 9/2013 | Li | H04L 43/0823 370/242 |
| 2014/0307564 A1* | 10/2014 | Li | H04L 67/141 370/242 |

OTHER PUBLICATIONS

"Common Interval Support in Bidirectional Forwarding Detection", IETF, Dec. 2014.*

"Seamless Bidirectional Forwarding Detection (BFD) with MPLS Label Verification Extension draft-akiya-bfd-seamless-base-00", IETF, Jun. 7, 2013, RFC7419.*

Katz, et al., "Bidirectional Forwarding Detection (BFD)," Internet Engineering Task Force (IETF), RFC 5880, Jun. 2010, 50 pages; http://tools.ietf.org/pdf/rfc5880.pdf.

* cited by examiner

| VERS | DIAG | STA | P | F | C | A | D | M | DETECT MULT | LENGTH |
|---|---|---|---|---|---|---|---|---|---|---|
| MY DISCRIMINATOR (LOCALLY ASSIGNED BFD DISCRIMINATOR) ||||||||||||
| YOUR DISCRIMINATOR (NON-ZERO GLOBALLY ASSIGNED BFD DISCRIMINATOR) ||||||||||||
| DESIRED MINIMUM TX INTERVAL ||||||||||||
| REQUIRED MINIMUM RX INTERVAL ||||||||||||
| REQUIRED MINIMUM ECHO RX INTERVAL ||||||||||||

SEAMLESS PATH MONITORING AND RAPID FAULT ISOLATION USING BIDIRECTIONAL FORWARDING DETECTION IN A NETWORK ENVIRONMENT

CROSS-REFERENCE TO RELATED APPLICATION

This application claims the benefit of priority under 35 U.S.C. §119(e) to U.S. Provisional Application Ser. No. 61/831,943 "SEAMLESS BIDIRECTIONAL FORWARDING DETECTION (BFD) WITH MPLS LABEL VERIFICATIONS EXTENSION, AND PROCEDURES FOR SEGMENT ROUTING (SR) AND IP BASED BFD" filed on Jun. 6, 2013 and to U.S. Provisional Application Ser. No. 61/838,951, "SEAMLESS BIDIRECTIONAL FORWARDING DETECTION (S BFD) ALERT DISCRIMINATOR AND BFD PATH TRACING" filed on Jun. 25, 2013, both of which are hereby incorporated by reference in their entirety.

TECHNICAL FIELD

This disclosure relates in general to the field of communications and, more particularly, to seamless path monitoring and rapid fault isolation using bidirectional forwarding detection (BFD) in a network environment.

BACKGROUND

Path monitoring (e.g., path availability validation, path outage, service availability validation, service outage, etc.) and rapid fault isolation are increasingly important features of networking equipment. Rapid detection of communication failures between network nodes can be desirable, for example, to quickly establish alternative paths. Detection can depend on the hardware and media used in networks. For example, Synchronous Optical Network (SONET) uses alarm signals to notify of failures. However, some media (e.g., Ethernet) do not provide such signaling even if faults are detected; other media may not even detect certain faults in the path, for example, failing interfaces or forwarding engine components. Typically, networks use relatively slow "Hello" mechanisms, usually in routing protocols, to detect failures (e.g., when hardware signaling is unavailable). The time to detect failures in such protocols can be far too long for some applications and can result in loss of large amount of data.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIG. 3 is a simplified block diagram illustrating other example details of an embodiment of the communication system;

DETAILED DESCRIPTION OF EXAMPLE EMBODIMENTS

Overview

An example method for seamless path monitoring and rapid fault isolation using BFD in a network environment is provided and includes determining a BFD target identifier type for communicating in a BFD session in a network environment, determining a non-zero globally assigned BFD discriminator value associated with the BFD target identifier type, populating a Your Discriminator field in a BFD Control Packet with the non-zero globally assigned BFD discriminator value, with a My Discriminator field in the BFD Control Packet being populated with a locally assigned BFD Discriminator value, and initiating (e.g., starting, originating, beginning, opening, commencing, etc.) the BFD session by transmitting the BFD Control Packet to a target node in the network. The target node is configured to listen for BFD Control Packets having the non-zero globally assigned BFD discriminator value in respective Your Discriminator fields.

As used herein, the term "BFD session" comprises a communication session substantially set up according to BFD protocols (e.g., according to Internet Engineering Task Force (IETF) Request for Comments (RFC) 5880) between two nodes in a network. A "node" may be any computers, network appliances, servers, routers, switches, gateways, bridges, load-balancers, firewalls, processors, modules, or any other suitable device, component, element, or object capable of sending, receiving, or forwarding information over communications channels in a network. In a general sense, any set of network entities (e.g., applications, servers, virtual machines, etc.) may be selected to be included in path monitoring (including fault detection) and fault isolation operations according to the embodiments described herein. As used herein, the term "BFD Discriminator" comprises any number, letters, or combinations thereof that can be included in appropriate BFD fields (e.g., My Discriminator and Your Discriminator fields) in a BFD Control Packet (e.g., a unit of data routed between a source and a destination over a network according to BFD protocols, for example, as specified in RFC 5880).

Example Embodiments

Figure 1:
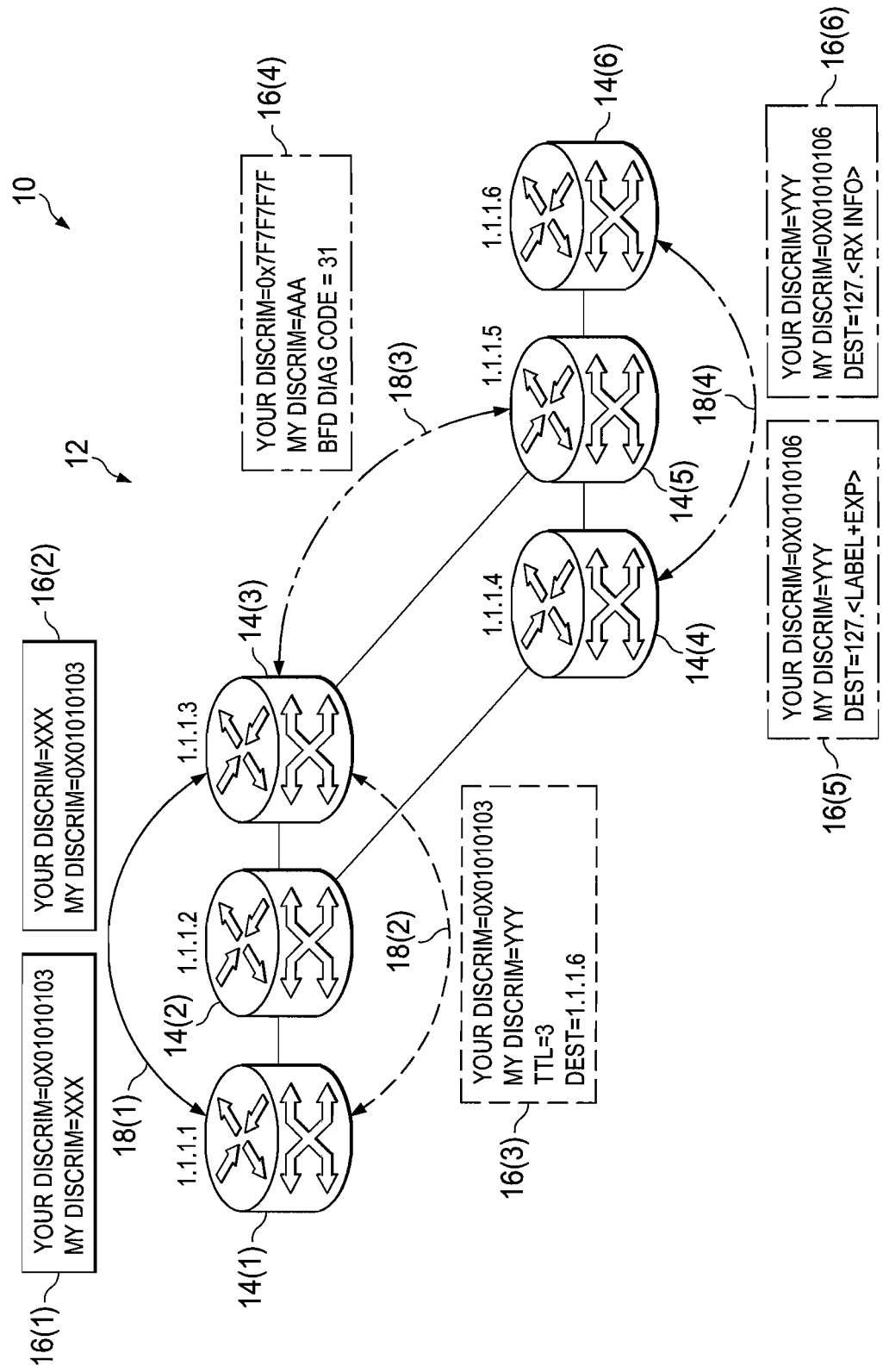
FIG. 1 is a simplified block diagram illustrating a communication system for seamless path monitoring and rapid fault isolation using BFD in a network environment.

Turning to FIG. 1, FIG. 1 is a simplified block diagram illustrating a communication system 10 for seamless path monitoring and rapid fault isolation using BFD in a network environment in accordance with one example embodiment. Communication system 10 includes a network 12 including a plurality of nodes 14(1)-14(6). Each node 14(1)-14(6) may host (e.g., support, control, facilitate network connectivity, etc.) one or more network entities, such as applications, servers, service appliances, etc. Each node 14(1)-14(6) may be associated with a unique address, such as an Internet Protocol (IP) address, or router identifier (ID). In the example illustrated in the figure, node 14(1) has an address of 1.1.1.1; node 14(2) has an address of 1.1.1.2; node 14(3) has an address of 1.1.1.3; and so on. Each node 14(1)-14(6) may send or receive BFD Control Packets 16 (e.g., 16(1)-16(6)) to/from other nodes in network 12 in corresponding BFD sessions 18 (e.g., 18(1)-18(4)).

Embodiments of communication system 10 can provide a fast and deterministic, fault isolation method for BFD end-to-end multi-hop fault detection. Embodiments of communication system 10 can also facilitate a simplified mechanism to use BFD protocol with large portions of negotiation aspects eliminated, for example, to allow full and partial reachability validations. Embodiments of communication system 10 may also use BFD for Multiprotocol Label Switching (MPLS) label verifications. The mechanisms disclosed herein can further provide flexibilities and various benefits in network fault isolation and detection. In addition, embodiments of communication system 10 may be applied to segment routing, and IP based BFD sessions, for example, to simplify operations.

For purposes of illustrating the techniques of communication system 10, it is important to understand the communications that may be traversing the system shown in FIG. 1. The following foundational information may be viewed as a basis from which the present disclosure may be properly explained. Such information is offered earnestly for purposes of explanation only and, accordingly, should not be construed in any way to limit the broad scope of the present disclosure and its potential applications.

BFD is a network protocol used to detect faults between two forwarding engines connected by a link. BFD provides a fast failure detection mechanism between nodes, which are adjacent to each other or multiple hops away. BFD is standardized according to IETF RFC 5880. BFD's detection protocol can provide fast forwarding path failure detection times for various media types, encapsulations, topologies, and routing protocols. BFD provides low-overhead detection of faults even on physical media that do not support failure detection of any kind, such as Ethernet, virtual circuits, tunnels and MPLS Label Switched Paths (LSPs). BFD operates independently of media, data protocols, and routing protocols.

In a general sense, BFD establishes a session between two endpoints over a particular link. If more than one link exists between two endpoints, multiple BFD sessions may be established to monitor each link. BFD does not have a discovery mechanism; sessions are explicitly configured between endpoints. BFD is agnostic to different underlying transport mechanisms and layers; thus, BFD packets are encapsulated by the specific transport used for the BFD session. For example, monitoring MPLS LSPs involves piggybacking session establishment on LSP-Ping packets. BFD operates on top of any data protocol (network layer, link layer, tunnels, etc.) being forwarded between the two endpoints. BFD is always run in a unicast, point-to-point mode. BFD packets are carried as payload of whatever encapsulating protocol is appropriate for the medium and network. The context of the operation of any particular BFD session is bound to its encapsulation.

A BFD session may operate in one of two modes: asynchronous mode and demand mode. In asynchronous mode, both endpoints periodically send BFD Control Packets (e.g., Hello packets) to each other. If a certain number of those packets are not received within a predetermined time interval, the session is considered down. In demand mode, no BFD Control Packets are exchanged after the BFD session is established; however, either endpoint may send BFD Control Packets if needed. Regardless of which mode is in use, either endpoint may also initiate an Echo function, used to test a forwarding path on the remote endpoint. When the Echo function is active, a stream of Echo packets is sent from one endpoint and the remote endpoint returns the Echo packets back to the sender via its forwarding plane.

The BFD Control Packet has a mandatory section and an optional authentication section. In particular, the mandatory section includes a My Discriminator field, which comprises a unique, nonzero discriminator value generated by the transmitting endpoint, and used to de-multiplex multiple BFD sessions between the same pair of endpoints. The mandatory section also includes a Your Discriminator field, which comprises the discriminator corresponding to the value of My Discriminator received from the corresponding remote endpoint. This field reflects back the received value of My Discriminator, or is zero if the value is unknown (e.g., in an initial BFD Control Packet). Thus, each endpoint chooses a unique, opaque discriminator value that identifies each session at the endpoint.

The local discriminator is sent in the My Discriminator field in the BFD Control Packet, and is echoed back in the Your Discriminator field of packets sent from the remote endpoint. After the remote endpoint echoes back the local discriminator, all further received packets are de-multiplexed based on the Your Discriminator field only (e.g., thus the source address field can change or the interface over which the packets are received can change, but the packets will still be associated with the proper session).

Turning to MPLS, MPLS requires a set of procedures for augmenting network layer packets with "label stacks", thereby turning them into "labeled packets". In contrast to traditional IP network, in MPLS, a first router does a routing lookup, but instead of finding a next-hop, it finds the final destination router and a pre-determined path (label switched path (LSP)) from the source to the destination router. (In traditional IP networks, each router performs an IP lookup ("routing"), determines a next-hop based on its routing table, and forwards the packet to that next-hop. Each router makes its own independent routing decisions, until the final destination is reached.) The first router applies a "label" based on the information and other routers along the path use the label to route the traffic without performing any additional IP lookups. (The MPLS label includes a 3 bit experimental field ("EXP") for specifying quality of service (QoS) treatment (e.g., per hop behavior), or other pertinent information.) Each LSP, which is a network-wide tunnel, has a corresponding link-local value label; the MPLS signaling protocol maps LSPs to specific label values. At the final destination router, the label is removed and the packet is delivered via normal IP routing.

In Segment Routing (SR), a node steers a packet through a controlled set of instructions, called segments, by prepending the packet with an SR header. The segment can represent any instruction, topological (e.g., forwarding information) or service-based (e.g., servicing information); in a general sense, the segment can represent any path (e.g. an adjacency segment forces a packet to a nexthop through a specific adjacency even if the shortest-path to the next-hop does not use that adjacency). Segment Routing control-plane can be applied to the MPLS dataplane: a node segment (e.g., path to a node) to node N is instantiated in the MPLS dataplane as an LSP along the shortest-path (SPT) to the node. An adjacency segment (e.g., representing a specific adjacency to a node) is instantiated in the MPLS dataplane as a cross-connect entry pointing to a specific egress datalink. The segment can have a local semantic to an SR node or global within an SR domain.

The SR header contains a source route encoded as a list of segments {SD, SB, SS, SF, SE}, a pointer (Ptr) and identification of the ingress and egress SR edge routers (segments SI and SE). The instruction associated with the global segment is recognized and executed by any SR-capable node in the SR domain. Each segment is identified by the segment ID, and each node on the segment by a corresponding node segment ID.

BFD can be used to detect data plane failure in a forwarding path of an MPLS LSP or SR path. A BFD session is established for a particular MPLS LSP being verified. BFD Control Packets are sent along the same data path as the LSP being verified and are processed by the BFD processing module of the egress link state router (LSR). If multiple alternate paths exist from an ingress LSR to an egress LSR, LSP Ping traceroute may be used to determine each of the alternate paths and separate BFD sessions are established for each alternate path that is discovered.

The BFD session in MPLS enabled networks is bootstrapped using LSP Ping. An LSP Ping echo request message carries the local discriminator assigned by the ingress LSR for the BFD session. The local discriminator is subsequently used as the My Discriminator field in the BFD session packets sent by the ingress LSR. On receipt of the LSP Ping Echo request message, the egress LSR sends a BFD Control Packet to the ingress LSR. The Your Discriminator field in the response BFD Control Packet is set to the discriminator received from the ingress LSR in the LSP Ping Echo request message. The egress LSR responds with an LSP Ping Echo reply message that carries the local discriminator assigned by it for the BFD session. The local discriminator assigned by the egress LSR is used as the My Discriminator field in the BFD Control Packets sent by the egress LSR. The BFD Control Packets sent by the ingress LSR are encapsulated in the appropriate MPLS label stack.

When multi-hop BFD (e.g., IP based or MPLS based) declares a failure, responsibility of identifying the problematic point in the paths is often left to network operators. In some situations, Internet Control Message Protocol (ICMP) echo request/reply (IP ping) (e.g., according to RFC 0792) and LSP echo request/reply (LSP ping) (e.g., according to RFC 4379) allow for tracing of hops to a specific target and can be used, manually or automatically, to attempt to isolate faults. However, identifying the specific problematic point (e.g., network node) that caused BFD failure can be difficult, if not impossible, with such mechanisms. For example, usage of non-BFD (e.g., ICMP, or LSP Ping) packets to perform fault isolation can result in the non-BFD packets being load balanced differently according to Equal-cost multi-path (ECMP) routing algorithms, causing the packets to traverse paths that are different from the paths traversed by the BFD packets, thereby preventing problem isolation.

Because BFD is simple and has low overhead, BFD may be more preferable to IP or LSP ping for scale and performance capacities, allowing for increased probability to identify short-lived transient issues. However, after BFD detects a failure, the network operators need a fast reliable way of performing fault isolation, such as tracing hops to the specific target, which BFD cannot provide. Currently existing BFD mechanisms do not provide fast, deterministic end-to-end multi-hop fault detection and fault isolation.

There are scenarios where only one side of the BFD is interested in performing reachability validations. One example is when static routing uses BFD to validate a next-hop IP address. Another example is when a unidirectional tunnel uses BFD to validate reachability to the egress node. With these scenarios, corresponding BFD sessions can be provisioned or instantiated on target nodes (e.g., static route next-hop node, egress of RSVP-TE unidirectional LSP) but adds minimal value to those nodes, if any.

Moreover, although BFD provides data delivery confidence when reachability validation is performed prior to traffic utilizing specific paths or LSPs, network traffic is prevented from using the specific paths or LSPs until BFD is able to validate the reachability, which could take seconds due to BFD session bring-up sequences (e.g., according to RFC 5880), LSP ping bootstrapping (e.g., according to RFC 5884), etc. Thus, reduction in BFD reachability validation times can provide faster service availability in BFD provisioned paths or LSPs. In addition, it is expected that some MPLS technologies may require traffic engineered LSPs to be created dynamically, driven by external applications (e.g., according to software defined networking (SDN)). It may be desirable to perform BFD validation quickly to allow applications to utilize dynamically created LSPs in a timely manner.

In a general sense, although typical BFD mechanisms provide end-to-end reachability validations, they do not allow partial reachability validations such as ingress to transit, transit to transit, transit to egress, etc. In addition, operating (e.g., according to RFC 5884) BFD protocols on existing MPLS technologies to perform end-to-end LSP liveliness verification check can may not allow validating traversal of the intended LSP path. Specifically one or more nodes along the LSP may incorrectly label switch the BFD packet, which may nevertheless manage to reach the intended LSP egress node.

Moreover, with MPLS technologies such as SR that do not use downstream label allocation scheme, the incoming label may often be allocated and advertised by a node multiple downstream hops away. Such broken LSPs can be detected according to RFC 4379, but the process may not be at a sufficiently fast rate for BFD. In addition, when nodes run multiple BFD sessions on a network target (e.g., corresponding to multiple applications, each of which may have a different failure detection time, or corresponding to multiple processors for redundancy), although resiliency against local isolated faults may be possible, reachability verifications of the LSPs may be difficult.

Communication system 10 is configured to address these issues (and others) in offering a system and method for seamless path monitoring and rapid fault isolation using BFD in a network environment. Assume, merely for example purposes that node 14(1) initiates a BFD session 18(1) with node 14(3). According to embodiments of communication system 10, initiator node 14(1) may determine a BFD target identifier type for communicating in BFD session 18(1) in network 12, determine a non-zero globally assigned BFD discriminator value (e.g., 0x01010103) associated with the BFD target identifier type (e.g., type 1), populate a Your Discriminator field in a BFD Control Packet 16(1) with the non-zero globally assigned BFD discriminator value (e.g., 0x01010103), populate a My Discriminator field in the BFD Control Packet with a locally assigned BFD Discriminator value (e.g., XXX), and initiating BFD session 18(1) by transmitting BFD Control Packet 16(1) to target node 14(3).

Each network node 14(1)-14(6) hosting the selected network entities may assign a non-zero globally assigned BFD discriminator to each selected local network entity. In one example, the non-zero globally assigned BFD discriminator may comprise any suitable 32 bit identifier that is globally unique to each node 14(1)-14(6) in network 12 (e.g., the non-zero globally assigned BFD discriminator 0x01010103 can uniquely identify target node 14(3) in network 12). In another example, the non-zero globally assigned BFD discriminator may be specially reserved for exclusive use in traceroute or other functions in network 12. According to various embodiments, the non-zero globally assigned BFD discriminators may be attached to corresponding network entities until they are explicitly un-provisioned.

Mappings between the selected network entities and corresponding non-zero globally assigned BFD discriminators in network 12 may be known by network nodes 14(1)-14(6), for example, through prior advertising. The mapping may be stored in respective BFD tables, comprising BFD discriminators, BFD target identifier types and BFD target identifiers. Any network node (e.g., 14(1)) in network 12 can send a BFD Control Packet (e.g., 16(1)) to a particular target node (e.g., 14(3)) within network 12 with the corresponding non-zero globally assigned BFD discriminator value in the Your Discriminator field. The target network node (e.g., 14(3)), upon receiving the BFD Control Packet (e.g., 16(1)), may lookup the Your Discriminator value in the BFD table and transmit a response BFD Control Packet (e.g., 16(2)) back to the sender node (e.g., 14(1)). All other nodes in the transit path may disregard the BFD Control Packet.

In a general sense, the BFD table can allow local network entities to perform various lookups (e.g., BFD discriminator to BFD target identifier type and BFD target identifier; BFD target identifier type and BFD target identifier to BFD discriminator; etc.). The BFD table may contain entries for substantially all locally reserved BFD discriminators and corresponding information. With segment routing BFD target identifier type and IP identifier type, locally reserved BFD discriminators and corresponding information can be included in the table. The BFD table may also contain entries from other network nodes, depending on the BFD target identifier type.

In contrast to the non-zero globally assigned BFD Discriminator, the locally assigned BFD discriminator may be local to the node (e.g., 14(1)) generating the initial BFD Control Packet (e.g., 16(1)). Thus, in the example illustrated in the figure, BFD Control Packet 16(1) may include a locally assigned My Discriminator value of XXX, and a non-zero globally assigned Your Discriminator value of 0x01010103, which can uniquely identify target node 14(3) on network 12. Multiple BFD instances to the same BFD target identifier can be differentiated based on disparate My Discriminator values. In other words, the locally assigned BFD discriminator populated in the My Discriminator field may be used to differentiate between different BFD sessions at the same node. For example, node 14(1) may run BFD sessions 18(1) and 18(2) substantially simultaneously. BFD session 18(1) may be differentiated from BFD session 18(2) at node 14(1) by the My Discriminator values in BFD Control Packets 16(1) and 16(3), respectively. BFD Control Packet 16(1) of BFD session 18(1) includes a My Discriminator of XXX and BFD Control Packet 16(3) of BFD session 18(2) includes a My Discriminator of YYY.

The non-zero globally assigned BFD discriminators may correspond to certain BFD target identifier types (e.g., categories, formats, etc.) based on the purpose of the BFD session, network protocols, and other factors. In specific embodiments, the non-zero globally assigned BFD discriminators may comprise IP addresses (or router IDs) for BFD target identifier type 1; the non-zero globally assigned BFD discriminators may comprise node segment IDs when used for segment routing with BFD target identifier type 2 (note that BFD target identifier type of value 2 may not be tied to any specific routing protocol); the non-zero globally assigned BFD discriminators may comprise Alert Discriminators used in traceroute operations corresponding to BFD target identifier type 3; and so on.

For example, the BFD target identifier type is type 1 when network 12 is an IP network, and corresponding the non-zero globally assigned BFD discriminator (0x01010103) indicates an IP address (e.g., 1.1.1.3) of the target node (e.g., 14(3)) when network 12 uses IPv4 addresses, and a router identifier (ID) associated with the target node (e.g., 14(3)) when network 12 uses IPv6 addresses. The router ID may comprise all or a subset of local Interior Gateway Protocol (IGP) router IDs in IPv6 networks; with Open Shortest Path First version 3 (OSPFv3), 32 bit router IDs may be used. For example, BFD Target Identifier Type 1: Router-ID 3.3.4.5 maps to BFD discriminator 0x03030405.

In other examples, BFD Target Identifier Type 1 for IPv4 address 1.1.1.1 may map to BFD discriminator 0x01010101; BFD Target Identifier Type 2 for Node segment identifier (ID) 0x03E800FF may map to BFD discriminator 0x03E800FF; etc. In some embodiments, identifiers of different BFD target identifier types may map to the same BFD discriminator. Note that an IPv4 address and a router-ID may map into the same BFD discriminator value without departing from the broad scope of the embodiments.

In specific embodiments, the non-zero globally assigned BFD discriminator may comprise an Alert Discriminator reserved by substantially all nodes 14(1)-14(6) in network 12 exclusively for BFD traceroute operations. A specific value may be reserved as the Alert Discriminator value by a group of network nodes (e.g., 14(1)-14(6)) in network 12. For example, 0x7F7F7F7F may be chosen as the Alert Discriminator for network 12; nodes 14(1)-14(6) may each reserve 0x7F7F7F7F as BFD target identifier type 3. Initiator node 14(3) may initiate session 18(3) and generate BFD Control Packet 16(4) with Your Discriminator 0x7F7F7F7F. Target node 14(5), on receiving BFD Control Packet 16(4), may recognize from the Your Discriminator value that BFD session 18(3) is intended for traceroute operations.

In various embodiments, when network 12 is enabled for MPLS, initiator node 14(1) may set a destination address in the BFD Control Packet to a localhost address (e.g., 127/8 IP address or 0:0:0:0:0:FFFF:7F00/104 for IPv6 address), and transmit the BFD Control Packet using MPLS (e.g., impose appropriate MPLS label stack, etc.). Embodiments of communication system 10 can perform MPLS label verification by setting a last 23 bits of the localhost address to an MPLS label. Thus, the initiator nodes can determine if the target nodes received the BFD Control packet on a specific interface.

For example, initiator node 14(4) may initiate BFD session 18(4) with target node 14(6) over MPLS. BFD Control Packet 16(5) generated by node 14(4) may include a <label+exp>value in the last 23 bits of the localhost address. With target identifier type 2 (SR enabled network), initiator node 14(4) can test an adjacency segment ID by encoding adjacency segment ID (label value+EXP) as lower 23 bits of localhost IP destination address. In some embodiments, the last 23 bits of the localhost address may be set to zero for reachability validation. When network 12 is enabled for SR, the MPLS label may include an adjacency segment ID.

If the last 23 bits of the 127/8 IP address is not zero, receiving node 14(6) may embed information reflecting how the packet was received (e.g., RX information) in the lower 23 bits of the localhost destination address in the response BFD Control Packet 16(6). For example, if receiving node 14(6) received the BFD Control Packet on a non-point-to-point interface, a source media access control (MAC) address may be examined to determine the "RX info" to embed in returning BFD Control Packet 16(6). With information embedded in last 23 bits of response BFD Control Packet 16(6), initiator node 14(4) can perform further verifications on how receiving node 14(6) received BFD Control Packet 16(5). For example, initiator node 14(4) can examine the lower 23 bits of IP destination address in BFD Control Packet 16(6) to determine if BFD Control Packet 16(5) was received by intended recipient node 14(6) in the expected way (e.g., expected RX interface). In an example embodiment, (label+EXP) may be encoded with the label portion in a higher 20 bits of the lower 23 bits of the 127/8 IP address and EXP portion in a lower 3 bits of the lower 23 bits of the 127/8 IP address.

Any network node 14(1)-14(6) can attempt to perform a full reachability validation to any BFD target identifier of type 1 (e.g., IPv4 address or router-ID) on other network nodes. Assume, merely for the sake of teaching, and not as a limitation, that node 14(1) attempts to perform a full reachability validation to node 14(3). Node 14(1) that initiates BFD Control Packet 16(1) can create active BFD session 18(1) to periodically send BFD Control Packets 16(1) to target node 14(3). BFD Control Packet 16(1) can also be generated and sent out on as needed basis (e.g., BFD ping) without any session presence.

Network nodes 14(1)-14(6) may create one or more reflector BFD session instances to listen for incoming BFD Control Packets with Your Discriminator comprising the respective non-zero globally assigned BFD discriminator (e.g., locally destined). For example, IPv4 address 1.1.1.3 is selected as a BFD target. Node 14(3) hosting IPv4 address 1.1.1.3 reserves BFD discriminator 0x01010103, and creates a BFD session instance in listening mode. Node 14(1) may transmit BFD Control Packet 16(1) to network 12 with destination IP address 1.1.1.3, source IP address 1.1.1.1, Your Discriminator=0x01010103 and My Discriminator=<locally assigned discriminator>(e.g., XXX).

Node 14(3) upon receiving BFD Control Packet 16(1), may swap the received Your Discriminator/My Discriminator field values and generate response BFD Control Packet 16(2) destined to node 14(1) (identified by the source address provided in the received BFD Control Packet 16(1)). Thus, in the example illustrated in the figure, in session 18(1), the My Discriminator value is 0x01010103 and the Your Discriminator value is XXX in response BFD Control Packet 16(2) sent by node 14(3) to initiator node 14(1). If initiator node 14(1) receives a valid BFD Control Packet (e.g., 16(2)) in response to transmitted BFD Control Packet 16(1), initiator node 14(1) may conclude that BFD Control Packet 16(1) reached its intended target node 14(3).

In some embodiments, the response BFD Control Packets 16 may be capable of sending one of two states: UP and ADMINDOWN. For example, the reflector BFD session can communicate to some or all initiators that the monitored BFD target identifier is "temporarily out of service", by setting "state" in the response BFD Control Packets to ADMIN DOWN. If the reflector BFD session is generating a response BFD Control Packet for BFD target identifier in service, the "state" in the response BFD Control Packet may be set to UP.

In some embodiments, one reflector BFD session can be responsible for handling responses to received BFD Control Packets targeted to all local BFD target identifiers; in other embodiments, multiple reflector BFD sessions can each be responsible for a subset of local BFD target identifiers. For example, a specific reflector BFD session may be created exclusively to listen for incoming BFD Control Packets with Your Discriminator of BFD target identifier type 3 (Alert Discriminators). In some embodiments, the same reflector BFD session may handle all incoming BFD Control Packets in address agnostic fashion; in other embodiments, multiple reflector BFD sessions may handle incoming BFD Control Packets with different address families. In general, incoming BFD Control Packets destined to any BFD target identifier type may be IPv4, IPv6 or MPLS based packets.

Alert Discriminators may be used in specific embodiments where any node on network 12 is able to use BFD Control Packets 16 to reach all transit nodes towards a target node. Embodiments of communication system 10 provide for encoding instructions in a diagnostic code, for example, to request triggering of specific behaviors at receiver (e.g., target) nodes. In particular embodiments, at least one specific diagnostic code may be specified in BFD Control Packets 16 using Alert Discriminators, for example, to allow BFD path tracing (e.g., BFD traceroute).

In various embodiments, the diagnostic codes can provide reasons for sending the Alert Discriminator BFD Control Packets to responder nodes. (In a general sense, RFC 5880 specifies a field in the BFD Control Packet to describe diagnostic codes, according to a set of preconfigured diagnostic codes.) According to various embodiments, new diagnostic codes may be specified for use with Alert Discriminators. In some embodiments, the new diagnostic codes may be used exclusively with Alert Discriminators (i.e., BFD target identifier of type 3), and diagnostic codes according to RFC 5880 may be used with other BFD target identifier types. For example, in a specific embodiment, the Alert Discriminator diagnostic code comprises 31 for BFD path trace; in other words, BFD path trace (traceroute) may be performed using Alert Discriminator with Alert Discriminator diagnostic code set to 31.

In various embodiments, transmitted BFD Control Packet (e.g., 16(4)) indicating a BFD target identifier of type 3 may not include a zero diagnostic code. When a receiving BFD Control Packet indicates a BFD target identifier of type 3, any packet with BFD diagnostic code of zero may be dropped at the receiving node. In various embodiments, the BFD Control Packets comprising Alert Discriminators may also include IP destination address or MPLS label stack to describe the target; the Your Discriminator value may be set to the Alert Discriminator; the BFD diagnostic code may be set to 31 (e.g., to indicate BFD traceroute); a poll (P) bit may be set; and an incrementing or decrementing IP/MPLS time to live (TTL) may be used. (The TTL field is set by the sender, and reduced by 1 unit by every router on the route to the destination; the maximum TTL value is 255, corresponding to the maximum value of a single octet.) When incrementing TTL is used towards the BFD target, TTL may start at a value of 1; otherwise, TTL value may be set to N (where N is the number of nodes in network 12, or the maximum value of 255).

In response to received BFD Control Packet 16(4) targeted to local BFD target identifier of type 3 (Alert Discriminator), the reflector BFD session at receiving nodes (e.g., 14(5)) may examine the BFD diagnostic code. In various embodiments, the traceroute may be completed when there is no response from one of the nodes or when one of following conditions are met: (1) response BFD Control Packet has been received from the intended BFD target; and (2) if the IP address(es) of intended BFD target(s) is unknown, two consecutive response control packets (TTL+n and TTL+(n+1)) containing same IP source address is received. When decrementing TTL is used, the traceroute is completed when there is no response from one of the nodes or when TTL reaches 1.

Because there are no sequence numbers included in transmitted and received BFD Control Packets (without use of authentication) for BFD traceroute operations, initiator nodes may allow for some delay between multiple BFD trace route operations, for example, if the same My Discriminator value is used in the BFD Control Packets (e.g., to ensure the responses from multiple BFD traceroute operations do not conflict with each other, resulting in incorrectly recorded hops). The response BFD Control Packets comprise the Alert Discriminator value in the My Discriminator field; otherwise, the received BFD Control Packet may be ignored or dropped for purposes of the traceroute operations. In various embodiments, the IP source addresses of valid response BFD Control Packets may be recorded to form trace hops to the BFD target node.

In various embodiments, when a particular BFD session transitions from UP to DOWN state, traceroute may be substantially immediately triggered to the target node to attempt to isolate the fault. When the particular BFD session is in an UP state, traceroute operations may be occasionally triggered in the background to record the paths. The paths may be compared periodically to determine any changes. If changes are more frequent than expected, a warning may be logged, for example, to indicate potential network instability.

In various embodiments, BFD Control Packets 16 may be transmitted according to the underlying network protocols. For example, if BFD Control Packet 16(1) is sent via IP paths, the destination address in BFD Control Packet 16(1) is the IP address corresponding to target node 14(3)) (e.g., and corresponds to the BFD discriminator value in the Your Discriminator field) and the source IP address is the local IP address (e.g., IP address of node 14(1)). If BFD Control Packet 16(1) is sent via explicit label switching from initiator node 14(1), BFD Control Packet 16(1) may be imposed with a label stack associated with target node 14(3) (e.g., expected to reach target node 14(3)). In addition, the destination IP address is 127/8 for IPv4 and 0:0:0:0:0:FFFF: 7F00/104 for IPv6 (e.g., corresponding to localhost); the source IP address is the local IP address (e.g., of node 14(1)). Thus, forwarding information (e.g., MPLS label stack) may be separated from receiver information (e.g., Your Discriminator field value) in BFD Control Packet 16(1) (e.g., TX and RX information may be encoded separately in BFD Control Packet 16(1)).

In response to the received BFD Control Packet 16(1) indicating the BFD target identifier of type 1 (IP address or router-ID), or type 3 (Alert Discriminator), response BFD Control Packet 16(2) generated by node 14(3) may be targeted to the IP address corresponding to the received "source IP address" field value or the appropriate MPLS label value. In response to received BFD Control Packet 16(1) targeted to local BFD target identifier of type 2 (node segment ID), responder node 14(3) may impose the relevant node segment ID, corresponding to the obtained IP address, on response BFD Control Packet 16(2).

If the destination IP address of received BFD Control Packet 16(1) is not 127/8 for IPv4 or 0:0:0:0:0:FFFF:7F00/ 104 for IPv6, the destination IP address may be copied from the received source IP address, and vice versa (e.g., source IP address may be copied from the received destination IP address). If the destination IP address of received BFD Control Packet 16(1) is 127/8 for IPv4 or 0:0:0:0:0:FFFF: 7F00/104 for IPv6, then the received IP destination may be further examined to determine response transport options. In some embodiments, if the last 23 bits of 127/8 for IPv4 and 0:0:0:0:0:FFFF:7F00/104 for IPv6 is zero, then response may be label switched (or may be IP routed). If last 23 bits of 127/8 for IPv4 and 0:0:0:0:0:FFFF:7F00/104 for IPv6 is not zero, then response may be label switched and may not be IP routed.

In various embodiments, whereas full reachability may be accomplished by setting the TTL counter appropriately (e.g., to 255) in the BFD Control Packet sent by node 14(1), partial reachability may be accomplished by setting the TTL counter to less than the maximum value (e.g., 255 or the number of nodes in network 12). Assume merely for teaching purposes, and not as a limitation, that initiator node 14(1) performs a partial reachability validation towards identifier node 14(6) on identifier node 14(3) in BFD session 18(2). Node 14(1) may calculate a number of hops to identifier node 14(3); the TTL value based on the calculation can be used as the IP TTL or MPLS TTL in a BFD Control Packet 16(3) sent by node 14(1); Your Discriminator of the transmitted BFD Control Packet may carry BFD discriminator value corresponding to the target transit identifier node 14(3); and the label stack or IP destination address may be listed as that of identifier node 14(6).

Embodiments of communication system 10 provide a simple and light-weight BFD protocol for communication to all transit nodes along various network paths. Using BFD diagnostic code for instruction purpose can allow further extension of the mechanism to disparate network fault scenarios. Embodiments of communication system 10 can provide better scale and performance of router alert equivalent behavior compared to existing BFD and non-BFD mechanisms. In specific embodiments, building in fault isolation capability within BFD protocol can facilitate network instability detection capability within the BFD protocol. In addition, the simplified BFD protocols according to various embodiments may eliminate virtually all session negotiations and provide for wider detection coverage, allowing BFD to detect wider range of failure scenarios (e.g., broken LSP).

Embodiments of communication system 10 can provide scale, for example, by reducing the total number of BFD sessions in the network. Provisioning speed can be increased, for example, because session negotiation and session bring-up processes can be eliminated. Embodiments of communication system 10 can provide flexibility, allowing operators to provision many types of BFD sessions such as explicit LSP, loose LSP, IP based path, etc. Various embodiments of communication system 10 can co-exist and inter-operate with existing BFD technologies. Moreover, specific embodiments can be applied in scenarios where existing BFD protocols are unusable, such as unnumbered interfaces, anycast address, etc.

According to various embodiments, uniqueness of node segment identifier (ID) may be leveraged and need for My Discriminator/Your Discriminator negotiation may be eliminated. Relevant adjacency segment details can be carried in address fields, which can assist partial path validation and rapidly detect any path deviation, for example, supporting segment routing path validation. Existing BFD hardware may be extended to support rapid path deviation (and not just connectivity check). BFD path trace machinery may be used in specific embodiments to isolate the path failing (or deviating) node without loading or extending BFD packets. Embodiments of communication system 10 can provide scalable, end to end detection and isolation of network wide failures that works in IP and SR (among other network protocols).

Turning to the infrastructure of communication system 10, nodes 14 may be used in any suitable network topology, which can include any number of servers, hardware accelerators, virtual machines, switches and routers, and other nodes inter-connected to form a large and complex network. Nodes 14 may be coupled to other nodes through one or more interfaces employing any suitable wireless connection, which provides a viable pathway for electronic communications. Additionally, any one or more of these elements may be combined or removed from the architecture based on particular configuration needs.

Communication system 10 may include a configuration capable of TCP/IP communications for the electronic transmission or reception of data packets in a network. Communication system 10 may also operate in conjunction with a User Datagram Protocol/Internet Protocol (UDP/IP) or any other suitable protocol, where appropriate and based on particular needs. In addition, gateways, routers, switches, and any other suitable nodes (physical or virtual) may be used to facilitate electronic communication between various nodes in the network.

The example network environment may be configured over a physical infrastructure that may include one or more networks and, further, may be configured in any form including, but not limited to, local area networks (LANs), wireless local area networks (WLANs), cellular networks, virtual local area networks (VLANs), metropolitan area networks (MANs), wide area networks (WANs), Intranet, Extranet, any other appropriate architecture or system, or any combination thereof that facilitates communications in a network. In some embodiments, a communication link may represent any electronic link supporting a wireless environment such as, for example, wireless technologies (e.g., IEEE 802.11x). In other embodiments, communication links may represent a remote connection through any appropriate medium (e.g., digital subscriber lines (DSL), telephone lines, T1 lines, T3 lines, wireless, satellite, fiber optics, cable, Ethernet, etc. or any combination thereof) and/or through any additional networks such as a wide area networks (e.g., the Internet).

Note that the numerical and letter designations assigned to the elements of FIG. 1 do not connote any type of hierarchy; the designations are arbitrary and have been used for purposes of teaching only. Such designations should not be construed in any way to limit their capabilities, functionalities, or applications in the potential environments that may benefit from the features of communication system 10. It should be understood that communication system 10 shown in FIG. 1 is simplified for ease of illustration.

Figure 2:
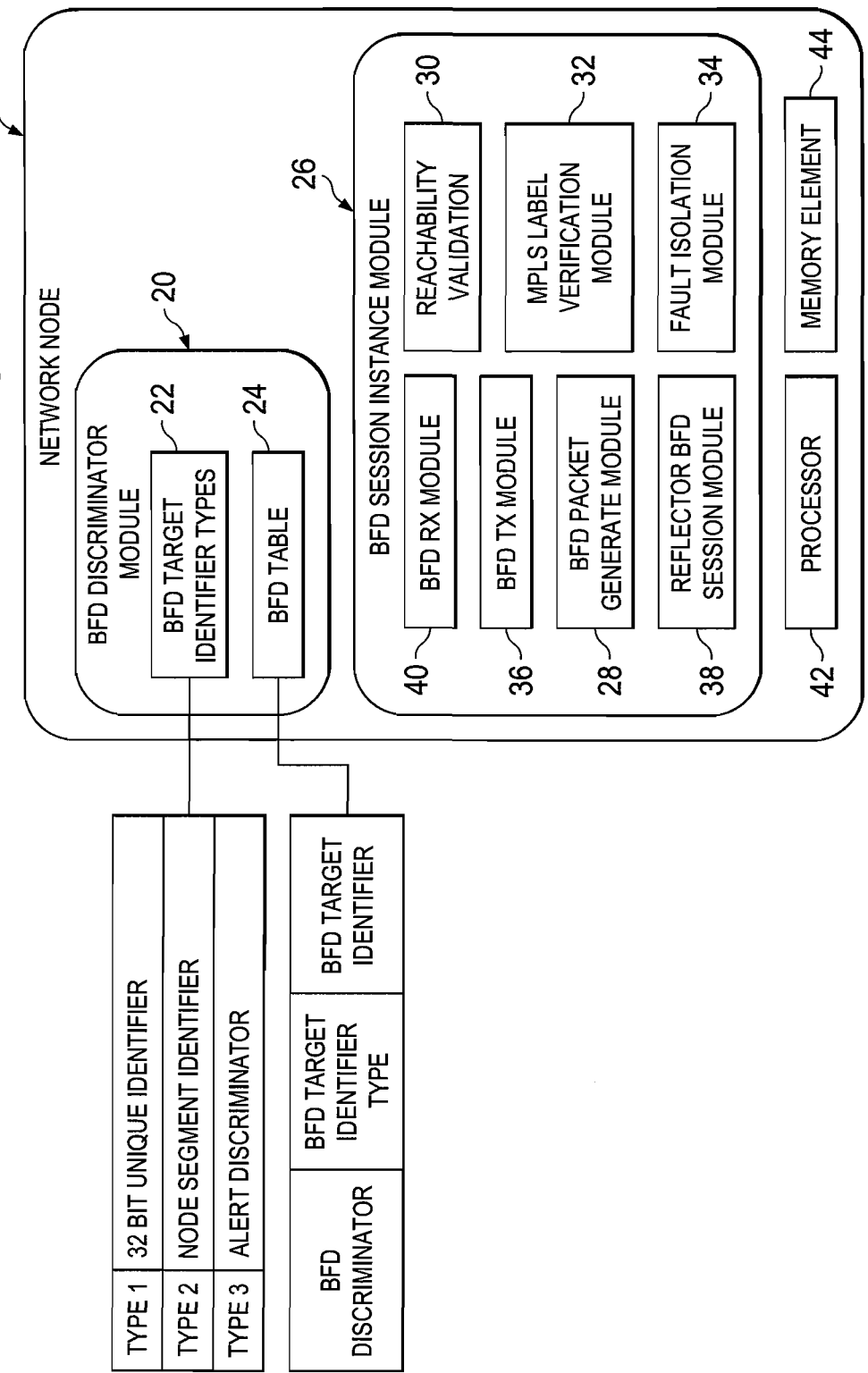
FIG. 2 is a simplified block diagram illustrating example details of an embodiment of the communication system.

Turning to FIG. 2, FIG. 2 is a simplified block diagram illustrating example details of an embodiment of communication system 10. Example network node 14 may include a BFD discriminator module 20, comprising BFD target identifier types 22 (type 1 corresponding to any 32 bit unique identifier of a target node in IP network 12; type 2 corresponding to a node segment ID in a segment routed network 12; and type 3 corresponding to alert discriminators for exclusive use in certain fault isolation operations such as traceroute) and a BFD table 24 comprising an association between BFD Discriminator values, BFD target identifier types and BFD target identifier (e.g., target node) Network node 14 may further include a BFD session instance module 26, comprising a BFD packet generate module 28, a reachability validation module 30, a MPLS label verification module 32, a fault isolation module 34, a BFD TX module 36, a reflector BFD session module 38, and a BFD RX module 40. Node 14 may also include a processor 42 and a memory element 44 for facilitating the operations described herein.

During configuration, BFD discriminator module 20 may assign a non-zero globally unique BFD discriminator value to node 14 and advertise the non-zero globally unique BFD discriminator value and corresponding BFD target identifier type to other nodes in network 12. For example, the IP address of node 14 may be assigned as the non-zero globally unique BFD discriminator value for BFD target identifier type 1 in network 12 and advertise to other nodes in network 12. Other nodes may assign the received BFD discriminator value to node 14 in corresponding BFD tables. Likewise, node 14 may receive advertisements of the BFD Discriminator values from other nodes and store the received advertised information in BFD table 24. Note that BFD table 24 may comprise any table, database, array, or other storage format suited to store appropriate parameters according to the embodiments of communication system 10.

During operation, BFD packet generate module 28 may generate a BFD Control Packet and populate the Your Discriminator field with the appropriate non-zero globally unique BFD discriminator value. For reachability validation purposes, reachability validation module 30 may be activated; reachability validation module 30 may compute the number of hope for reachability to other nodes and assign the appropriate TTL counter (e.g., 255 for full reachability; less than 255 for partial reachability; etc.). For MPLS label verification purposes, MPLS label verification module 32 may be triggered; MPLS label verification module 32 may insert a label+EXP value in a lower 23 bits of the localhost address in the IP destination address field of the BFD Control Packet. For fault isolation purposes, fault isolation module 34 may be triggered; fault isolation module 34 may insert the Alert Discriminator value in the Your Discriminator field, and assign the appropriate BFD diagnostic code in the BFD Control Packet. BFD TX module 36 may transmit the BFD Control Packet appropriately (e.g., assign the MPLS label stack in MPLS enabled network, etc.).

Reflector BFD session module 38 may open a reflector session to listen for incoming BFD Control Packets, including those in response to the transmitted BFD Control Packet. BFD RX module 40 may receive incoming BFD Control Packets, and take appropriate action. For example, for MPLS label verification, BFD RX module 40 may trigger MPLS label verification module 32, which may insert the RX info in the response BFD Control Packet. In other embodiments, BFD RX module 40 may inspect the lower 23 bits of the localhost address to verify the MPLS label. In another example, BFD RX module 40 may swap the My Discriminator and Your Discriminator values of the incoming BFD Control Packet into a response BFD Control Packet.

Turning to FIG. 3, FIG. 3 is a simplified block diagram illustrating an a mandatory section of an example BFD Control Packet 16 according to an embodiment of communication system 10. In particular embodiments, BFD Control Packet 16 includes a Your Discriminator field 46, comprising a non-zero globally assigned BFD discriminator appropriate to the BFD target identifier type and target node. BFD Control Packet 16 also includes a My Discriminator field 48 comprising a locally assigned BFD discriminator.

Figure 4:
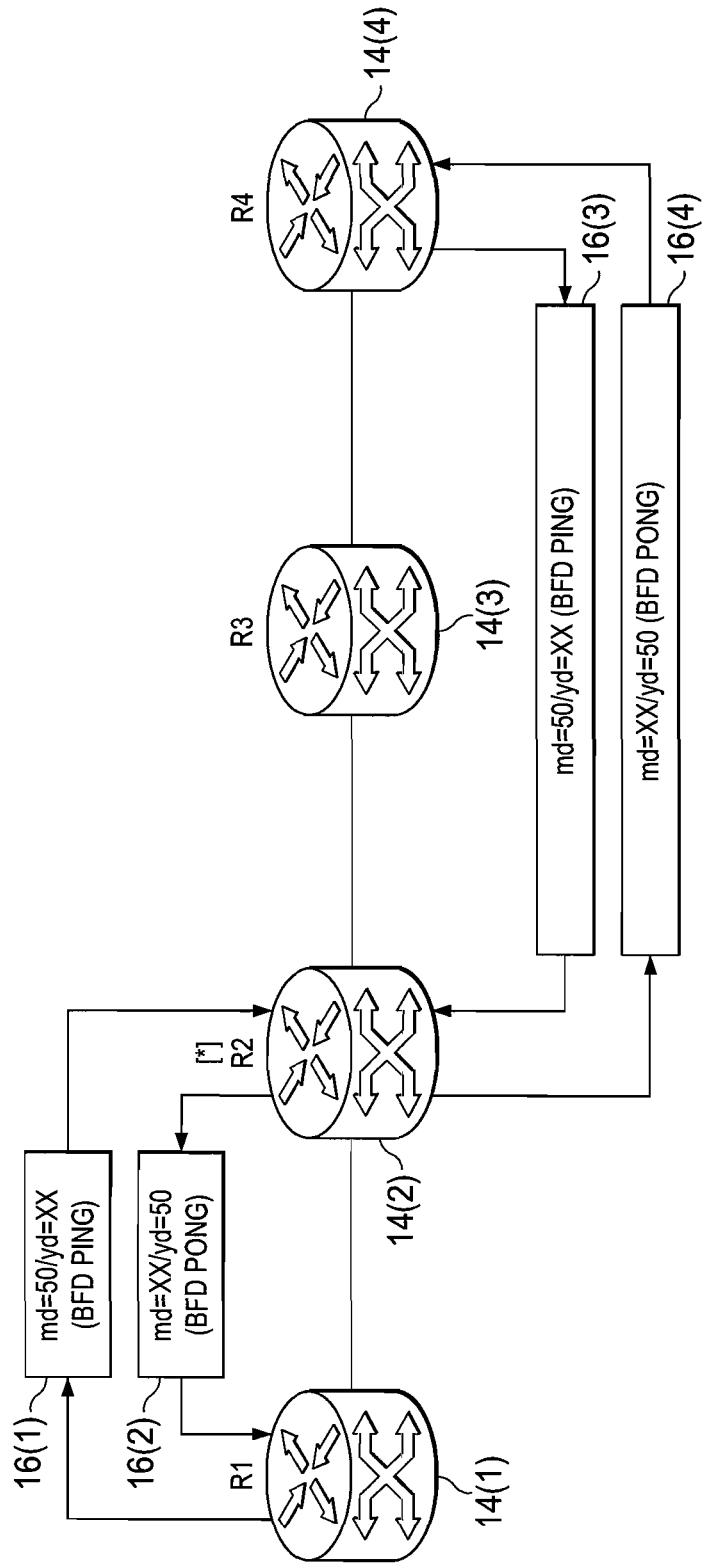
FIG. 4 is a simplified block diagram illustrating other example details of an embodiment of the communication system.

Turning to FIG. 4, FIG. 4 is a simplified block diagram illustrating example details of an embodiment of communication system 10. Nodes 14(1)-14(4) may communicate using BFD Control Packets 16. For example, node 14(2) may reserve XX as its non-zero globally assigned BFD discriminator and advertise the non-zero globally assigned BFD discriminator to other nodes 14(1), 14(3) and 14(4). Nodes 14(1) and 14(4) may perform full reachability validation to node 14(2). Node 14(1) may send BFD Control Packet 16(1) comprising Your Discriminator XX and My Discriminator 50 (locally assigned, and locally unique to node 14(1)). Node 14(2) may respond with BFD Control Packet 16(2), wherein the My Discriminator and Your Discriminator values are swapped (e.g., interchanged, exchanged, etc.). Likewise, node 14(4) may send BFD Control Packet 16(3) comprising Your Discriminator XX and My Discriminator 50 (locally assigned, and locally unique to node 14(4)). Node 14(2) may respond with BFD Control Packet 16(4), wherein the My Discriminator and Your Discriminator values are swapped.

Figure 5:
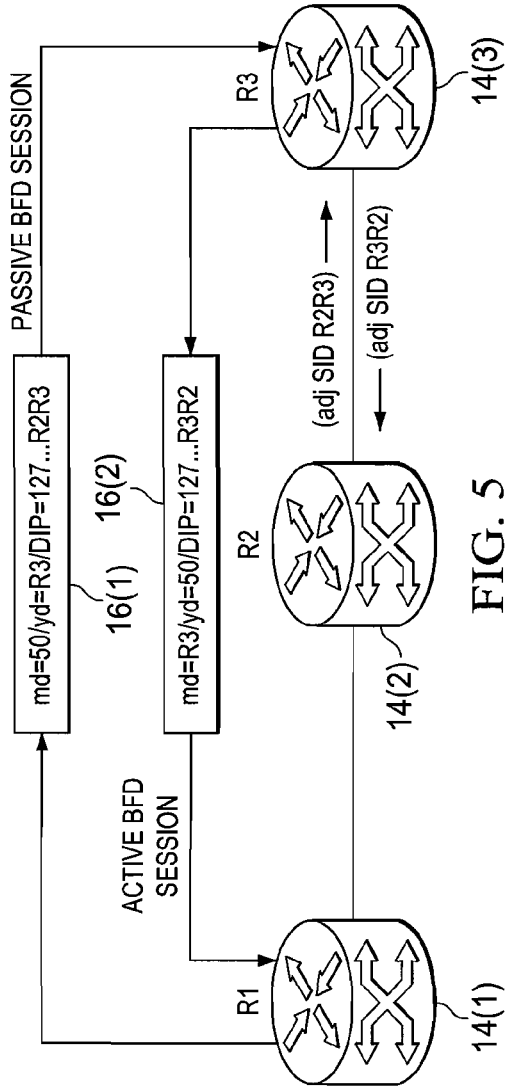
FIG. 5 is a simplified block diagram illustrating other example details of an embodiment of the communication system.

Turning to FIG. 5, FIG. 5 is a simplified block diagram illustrating example details associated with segment routing in network 12 according to an embodiment of communication system 10. With target identifier type 2, SR enabled network, when network node 14(1) wants to test an adjacency segment ID, the adjacency segment ID (label value+EXP) (e.g., R2R3) being tested may be encoded as lower 23 bits of localhost IP destination address in BFD Control Packet 16(1) and sent to destination node 14(4) by an active BFD session at node 14(1). When passive BFD session at node 14(4) receives SR BFD control packet 16(1) with non-zero lower 23 bits of IP destination address, response BFD Control Packet 16(2) may comprise adjacency segment ID (label value+EXP) (e.g., R3R2) corresponding to incoming interface as lower 23 bits of localhost IP destination address.

Figure 6:
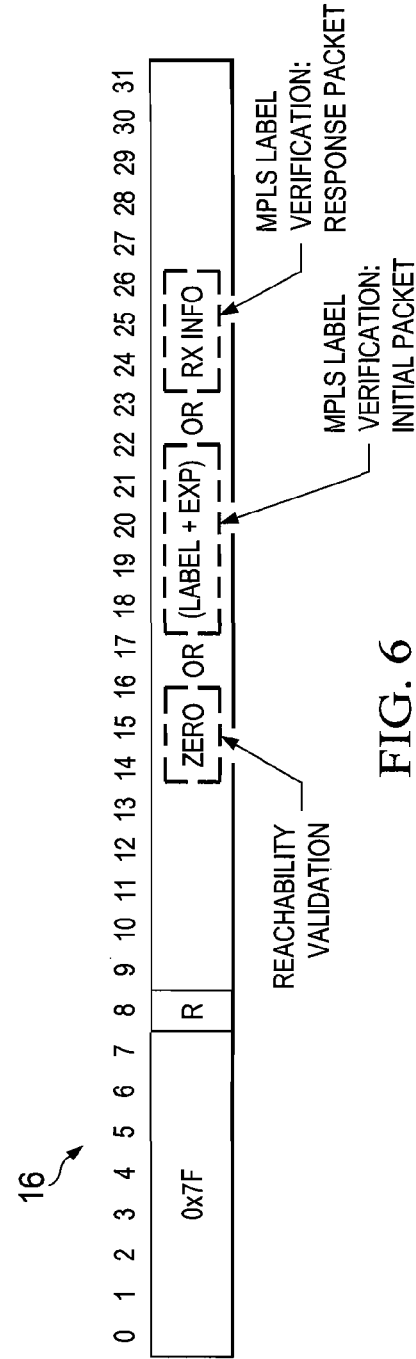
FIG. 6 is a simplified block diagram illustrating other example details of an embodiment of the communication system.

Turning to FIG. 6, FIG. 6 is a simplified block diagram illustrating example details of a BFD Control Packet 16 according to an embodiment of communication system 10. When a network node (e.g., 14(1)) wishes to perform MPLS label verification, BFD control packet 16 may include the lower 23 bits of 127/8 destination IP address embedded with (label value+EXP) that is used to reach the intended target node (e.g., 14(3)). Receiver node (e.g., 14(3)) may embed information reflecting how the packet was received in the lower 23 bits of 127/8 destination IP address in the response BFD control packet. If receiver node 14(3) received the BFD control packet on a non-point-to-point interface, source MAC address MAY need to be examined to determine the "RX info" to embed in the returning packet.

For full reachability validation, the lower 23 bits of the destination IP address may be set to zero (e.g., to conserve resources at the receiver node). The lower 23 bits of the destination IP address may be set to label+EXP for MPLS label verification in the initial packet; the lower 23 bits of the destination IP address may be set to RX into in the response packet for MPLS label verification. Initiator node receiving back the response can know that the packet did reach its intended target. The initiator node can also examine the lower 23 bits of the IP destination address in the received BFD Control Packet to determine if the packet sent was received by intended identifier in expected way (e.g., on the expected RX interface).

Figure 7:
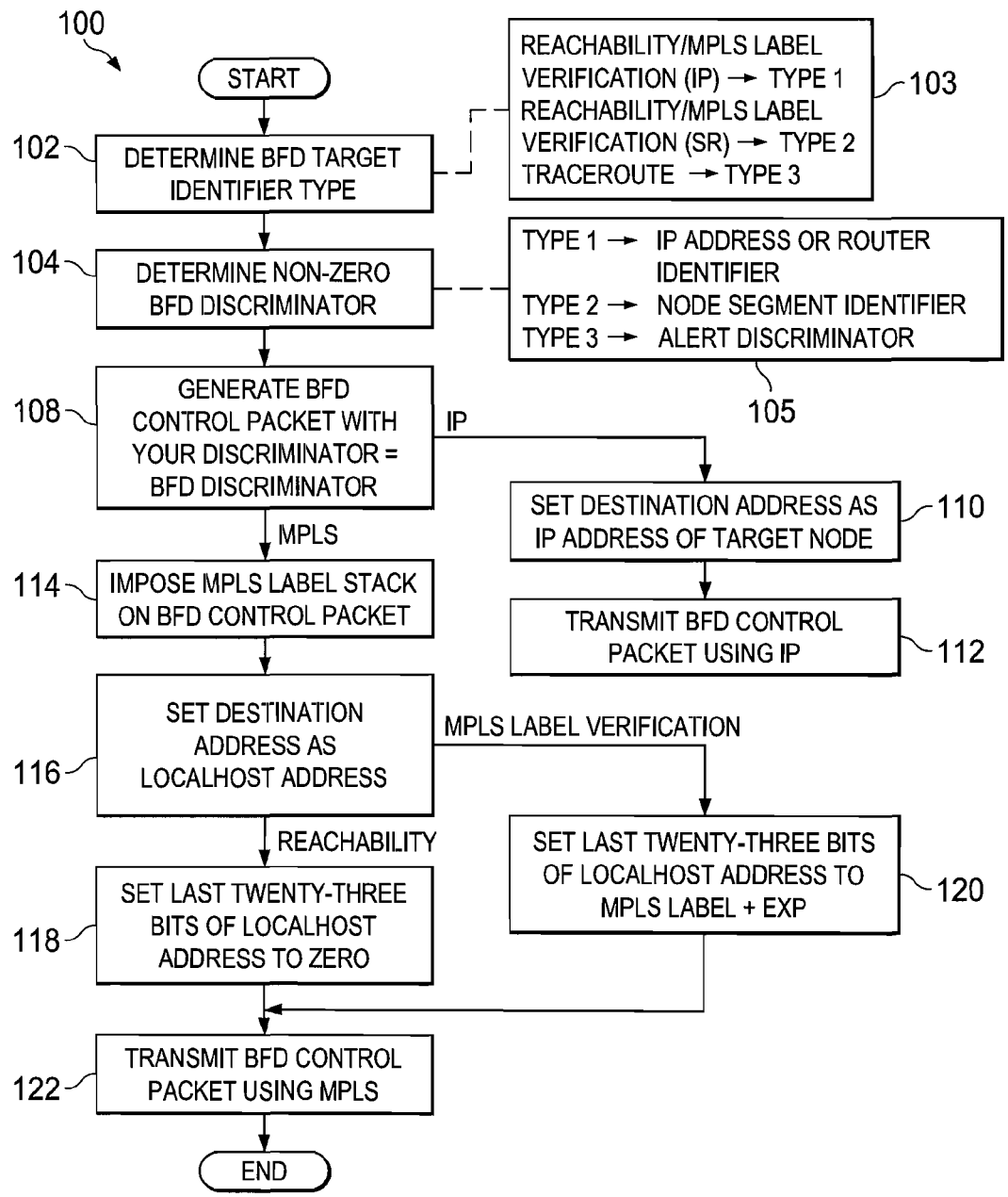
FIG. 7 is a simplified flow diagram illustrating example operations that may be associated with an embodiment of the communication system.

Turning to FIG. 7, FIG. 7 is a simplified flow diagram illustrating example operations 100 that may be associated with the initiator node according to embodiments of communication system 10. At 102, the initiator node may determine a BFD target identifier type for use in the operation. For example, the choices may include at 103, type 1 for reachability and MPLS label verification (using IP addresses); type 2 for reachability and MPLS label verification (using SR and node segment IDs); and type 3 for traceroute (using Alert Discriminator). At 104, the initiator node may determine a suitable non-zero globally assigned BFD discriminator to use in the BFD Control Packet. For example, the choices may include at 105, IP address or router ID for type 1; node segment ID for type 2; and Alert Discriminator for type 3. At 108, the initiator node may generate the BFD Control Packet with Your Discriminator set to the non-zero globally assigned BFD discriminator.

If the BFD Control Packet is to be transmitted over IP, at 110, the destination address may be set to the IP address of the target node. At 112, the BFD Control Packet may be transmitted using IP. On the other hand, if the BFD Control Packet is to be transmitted over MPLS, at 114, the appropriate MPLS label stack may be imposed on the BFD Control Packet. At 116, the destination IP address may be set to a localhost address (e.g., 127/8 for IPv4 or 0:0:0:0:0: FFFF:7F00/104 for IPv6 address). At 118, if the BFD session is being used for reachability validation, at 118, the last 23 bits of the localhost address may be set to zero. On the other hand, if the BFD session is being used for MPLS label verification, at 120, the last 23 bits of the localhost address may be set to MPLS label+EXP. At 122, the BFD Control Packet may be transmitted over MPLS.

Figure 8:
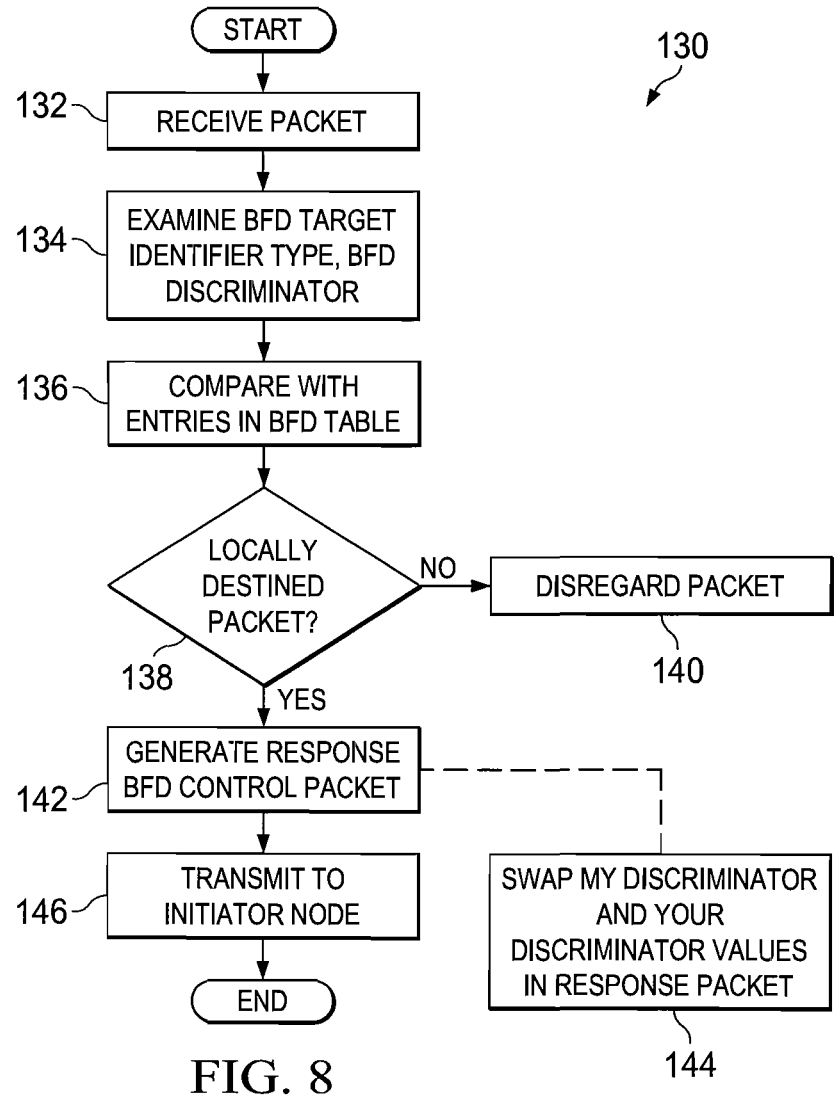
FIG. 8 is a simplified flow diagram illustrating other example operations that may be associated with an embodiment of the communication system.

Turning to FIG. 8, FIG. 8 is a simplified flow diagram illustrating example operations 130 that may be associated with embodiments of communication system 10. At 132, a BFD Control Packet may be received at a BFD reflector session. At 134, the BFD reflector session may examine the BFD target identifier type and the corresponding BFD discriminator in the Your Discriminator field. At 136, the BFD target identifier type and the corresponding BFD discriminator in the Your Discriminator field may be compared against entries in the BFD table. At 138, a determination may be made whether the BFD Control Packet is a locally destined packet. If not, at 140, the BFD Control Packet may be disregarded, and no further action may be taken on the packet (e.g., the packet may be forwarded to next hop, or dropped). If the BFD Control Packet is a locally destined packet, at 142, an appropriate response BFD Control Packet may be generated. Generating the response BFD Control Packet may include, for example, at 144, swapping the My Discriminator and Your Discriminator fields of the received BFD Control Packet. At 146, the response BFD Control Packet may be transmitted to the initiator node.

Figure 9:
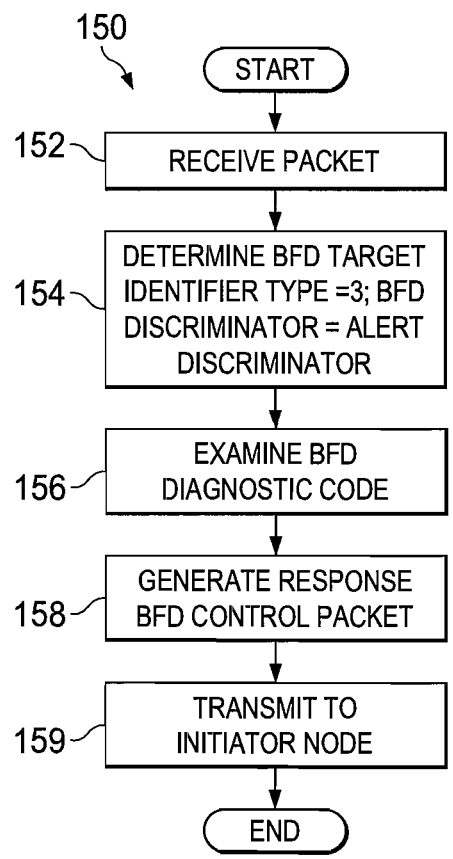
FIG. 9 is a simplified flow diagram illustrating yet other example operations that may be associated with an embodiment of the communication system.

Turning to FIG. 9, FIG. 9 is a simplified flow diagram illustrating example operations 150 that may be associated with the reflector BFD session according to embodiments of communication system 10. At 152, the reflector BFD session in listening mode may receive the BFD Control Packet sent by the initiator node. At 154, a determination may be made that the BFD target identifier is type 3 and the BFD discriminator in the Your Discriminator field corresponds to the Alert Discriminator. At 156, the BFD diagnostic code may be examined. At 158, the response BFD Control Packet may be generated (including swapping the My Discriminator and Your Discriminator field values). At 159, the response BFD Control Packet may be transmitted to the initiator node. In various embodiments, if the response BFD Control Packet does not include the Alert Discriminator in the My Discriminator field, the initiator node may drop the packet on receipt.

Figure 10:
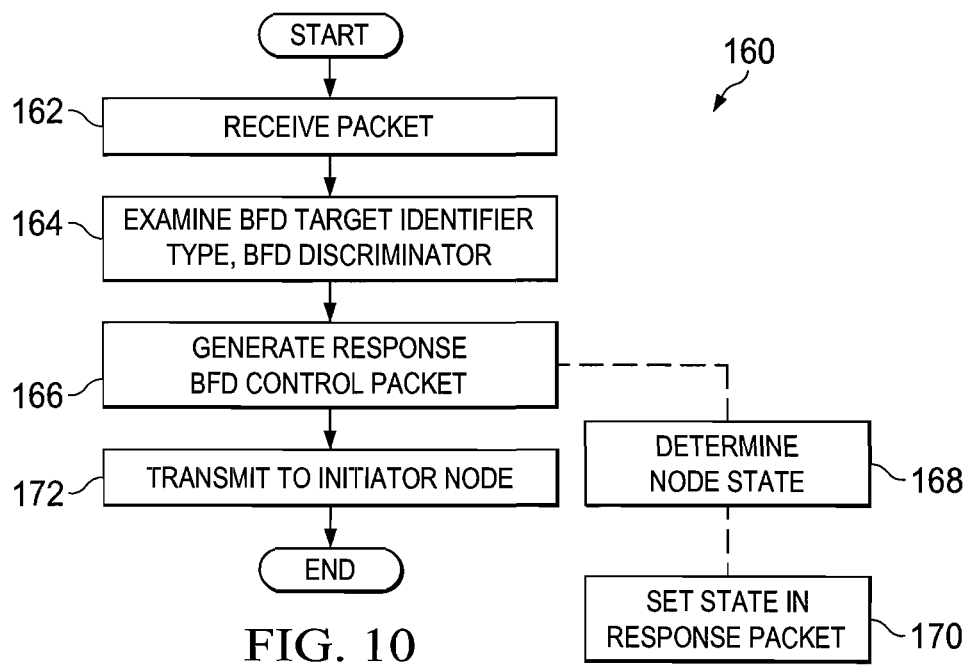
FIG. 10 is a simplified flow diagram illustrating other example operations that may be associated with an embodiment of the communication system.

Turning to FIG. 10, FIG. 10 is a simplified flow diagram illustrating example operations 160 that may be associated with the reflector BFD session according to embodiments of communication system 10. At 162, the reflector BFD session may receive a BFD Control Packet from an initiator node. At 164, the reflector BFD session may examine the BFD target identifier type and BFD discriminator in the Your Discriminator field. At 166, the reflector BFD session may generate the response BFD Control Packet, including, at 168, determining a state of the node, and at 170, setting the state appropriately (e.g., UP, ADMINDOWN, etc.) in the response BFD Control Packet. At 172, the response BFD Control Packet may be transmitted to the initiator node.

Figure 11:
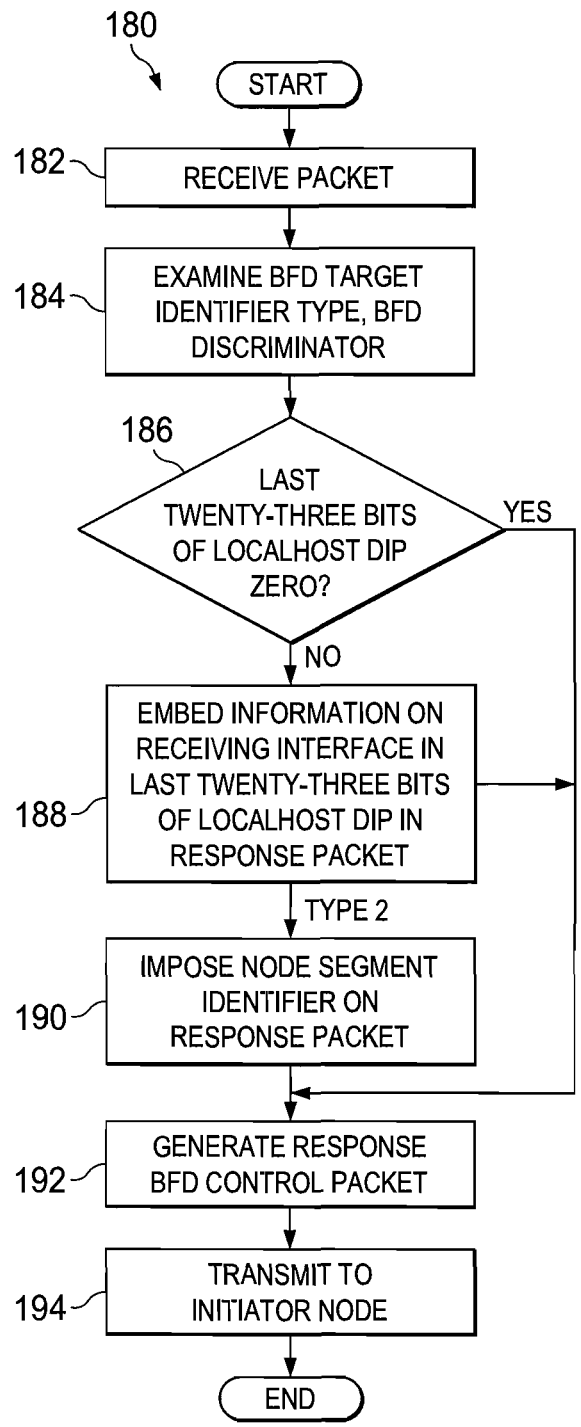
FIG. 11 is a simplified flow diagram illustrating other example operations that may be associated with an embodiment of the communication system.

Turning to FIG. 11, FIG. 11 is a simplified flow diagram illustrating example operations 180 that may be associated with the reflector BFD session according to embodiments of communication system 10. At 182, the reflector BFD session may receive a BFD Control Packet from an initiator node. At 184, the reflector BFD session may examine the BFD target identifier type and BFD discriminator in the Your Discriminator field. At 186, a determination may be made whether the last 23 bits in the localhost DIP is zero. If the last 23 bits in the localhost DIP is not zero, at 188, information on receiving interface (RX info) may be embedded in the last 23 bits of the localhost DIP in the response BFD Control Packet. In a SR enabled network (e.g., BFD target identifier of type 2), the node segment ID may be imposed on the response BFD Control Packet at 190. The response BFD Control Packet may be generated at 192 (including swapping the My Discriminator and Your Discriminator field values). The response BFD Control Packet may be transmitted to the initiator node at 194. Turning back to 186, if the last 23 bits of the localhost DIP in the received BFD Control Packet is zero, the operations may skip to 192.

Figure 12:
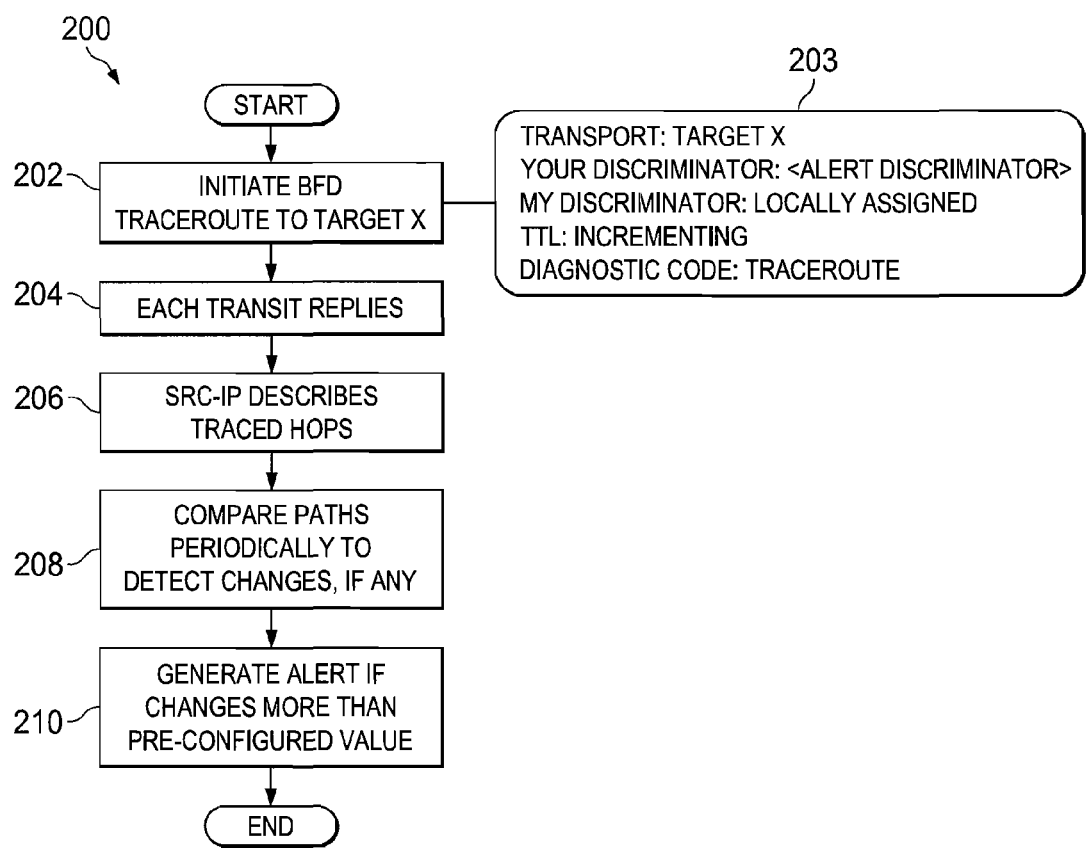
FIG. 12 is a simplified flow diagram illustrating other example operations that may be associated with an embodiment of the communication system.

Turning to FIG. 12, FIG. 12 is a simplified flow diagram illustrating example operations 200 that may be associated with traceroute BFD session according to embodiments of communication system 10. At 202, a BFD traceroute may be initiated to target X in the network. The BFD Control Packet at 203 may include, transport: target X; Your Discriminator: Alert Discriminator; My Discriminator: locally assigned BFD discriminator; TTL: incrementing (or decrementing, in some embodiments); and diagnostic code: traceroute. At 204, each transit node may reply. At 206, the source IP address of the response packets may facilitate tracing the hops traversed by the BFD Control Packet, allowing determination of the path taken by the BFD Control Packet. At 208, the paths may be periodically compared to detect any changes (e.g., the BFD Control Packet may be sent periodically to target X). At 210, an alert may be generated if the paths change more than a predetermined amount.

Note that, although the previous discussions have focused on certain protocols (some of which may have referenced a Standard, an RFC, etc., it is contemplated that other protocols, frameworks, rules, definitions, etc. could readily be used in conjunction with the teachings of the present disclosure. Stated otherwise, the present disclosure is not confined to the RFCs, definitions, protocols, etc. delineated herein.

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments.

Note also that an 'application' as used herein this Specification, can be inclusive of an executable file comprising instructions that can be understood and processed on a computer, and may further include library modules loaded during execution, object files, system files, hardware logic, software logic, or any other executable modules. Furthermore, the words "optimize," "optimization," and related terms are terms of art that refer to improvements in speed and/or efficiency of a specified outcome and do not purport to indicate that a process for achieving the specified outcome has achieved, or is capable of achieving, an "optimal" or perfectly speedy/perfectly efficient state.

In example implementations, at least some portions of the activities outlined herein may be implemented in software in, for example, nodes 14. In some embodiments, one or more of these features may be implemented in hardware, provided external to these elements, or consolidated in any appropriate manner to achieve the intended functionality. The various network elements (e.g., nodes 14) may include software (or reciprocating software) that can coordinate in order to achieve the operations as outlined herein. In still other embodiments, these elements may include any suitable algorithms, hardware, software, components, modules, interfaces, or objects that facilitate the operations thereof.

Furthermore, nodes 14 described and shown herein (and/or their associated structures) may also include suitable interfaces for receiving, transmitting, and/or otherwise communicating data or information in a network environment. Additionally, some of the processors and memory elements associated with the various nodes may be removed, or otherwise consolidated such that a single processor and a single memory element are responsible for certain activities. In a general sense, the arrangements depicted in the FIGURES may be more logical in their representations, whereas a physical architecture may include various permutations, combinations, and/or hybrids of these elements. It is imperative to note that countless possible design configurations can be used to achieve the operational objectives outlined here. Accordingly, the associated infrastructure has a myriad of substitute arrangements, design choices, device possibilities, hardware configurations, software implementations, equipment options, etc.

In some of example embodiments, one or more memory elements (e.g., memory element 44) can store data used for the operations described herein. This includes the memory element being able to store instructions (e.g., software, logic, code, etc.) in non-transitory media, such that the instructions are executed to carry out the activities described in this Specification. A processor can execute any type of instructions associated with the data to achieve the operations detailed herein in this Specification. In one example, processors (e.g., processor 42) could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

These devices may further keep information in any suitable type of non-transitory storage medium (e.g., random access memory (RAM), read only memory (ROM), field programmable gate array (FPGA), erasable programmable read only memory (EPROM), electrically erasable programmable ROM (EEPROM), etc.), software, hardware, or in any other suitable component, device, element, or object where appropriate and based on particular needs. The information being tracked, sent, received, or stored in communication system 10 could be provided in any database, register, table, cache, queue, control list, or storage structure, based on particular needs and implementations, all of which could be referenced in any suitable timeframe. Any of the memory items discussed herein should be construed as being encompassed within the broad term 'memory element.' Similarly, any of the potential processing elements, modules, and machines described in this Specification should be construed as being encompassed within the broad term 'processor.'

It is also important to note that the operations and steps described with reference to the preceding FIGURES illustrate only some of the possible scenarios that may be executed by, or within, the system. Some of these operations may be deleted or removed where appropriate, or these steps may be modified or changed considerably without departing from the scope of the discussed concepts. In addition, the timing of these operations may be altered considerably and still achieve the results taught in this disclosure. The preceding operational flows have been offered for purposes of example and discussion. Substantial flexibility is provided by the system in that any suitable arrangements, chronologies, configurations, and timing mechanisms may be provided without departing from the teachings of the discussed concepts.

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain network access and protocols, communication system 10 may be applicable to other exchanges or routing protocols. Moreover, although communication system 10 has been illustrated with reference to particular elements and operations that facilitate the communication process, these elements, and operations may be replaced by any suitable architecture or process that achieves the intended functionality of communication system 10.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method, comprising:
   determining a bidirectional forwarding detection (BFD) target identifier type for communicating in a BFD session in a network environment;
   determining a non-zero globally assigned BFD discriminator value associated with the BFD target identifier type, wherein, if the BFD target identifier type is indicative of executing traceroute operations in the network, the non-zero globally assigned BFD discriminator is an Alert Discriminator reserved by nodes in the network exclusively for BFD traceroute operations;
   populating a Your Discriminator field in a BFD Control Packet with the non-zero globally assigned BFD discriminator value, wherein a My Discriminator field in the BFD Control Packet is populated with a locally assigned BFD Discriminator value; and
   initiating the BFD session by transmitting the BFD Control Packet to a target node in the network, wherein the target node is configured to listen for BFD Control Packets having the non-zero globally assigned BFD discriminator value in respective Your Discriminator fields.

2. The method of claim 1, wherein the non-zero globally assigned BFD discriminator comprises any 32 bit value that can uniquely identify the target node in the network.

3. The method of claim 1, wherein if the BFD target identifier type is type 1 on an Internet Protocol (IP) network, the non-zero globally assigned BFD discriminator is an IP address of the target node when the network uses IPv4 addresses, and the non-zero globally assigned BFD discriminator is a router identifier (router ID) associated with the target node when the network uses IPv6 addresses.

4. The method of claim 1, wherein if the BFD target identifier type is type 2 on a segment routing (SR) enabled network, the non-zero globally assigned BFD discriminator is a node segment ID associated with the target node.

5. The method of claim 1, wherein the BFD target identifier type is type 3 for executing traceroute operations in the network.

6. The method of claim 5, further comprising specifying a BFD diagnostic code associated with the Alert Discriminator in the BFD Control Packet, wherein the BFD diagnostic code indicates a reason for using the type 3 BFD target identifier.

7. The method of claim 1, wherein the network is enabled for Multiprotocol Label Switching (MPLS), wherein the method further comprises setting a destination address in the BFD Control Packet to a localhost address, wherein the BFD Control Packet is transmitted using MPLS.

8. The method of claim 7, wherein a last 23 bits of the localhost address includes an MPLS label for MPLS label verification, wherein the last 23 bits of the localhost address is set to zero for reachability validation.

9. The method of claim 8, wherein the MPLS label includes an adjacency segment ID on a SR enabled network.

10. The method of claim 1, wherein the target node receives the BFD Control Packet, examines the Your Discriminator and My Discriminator fields, swaps values in the My Discriminator and Your Discriminator fields in a response BFD Control Packet, and transmits the response BFD Control Packet to a source address provided in the BFD Control Packet.

11. Non-transitory tangible media that includes instructions for execution, which when executed by a processor of a network node, is operable to perform operations comprising:
   determining a BFD target identifier type for communicating in a BFD session in a network environment;
   determining a non-zero globally assigned BFD discriminator value associated with the BFD target identifier type, wherein, if the BFD target identifier type is indicative of executing traceroute operations in the network, the non-zero globally assigned BFD discriminator is an Alert Discriminator reserved by nodes in the network exclusively for BFD traceroute operations;
   populating a Your Discriminator field in a BFD Control Packet with the non-zero globally assigned BFD discriminator value, wherein a My Discriminator field in the BFD Control Packet is populated with a locally assigned BFD Discriminator value; and
   initiating the BFD session by transmitting the BFD Control Packet to a target node in the network, wherein the target node is configured to listen for BFD Control Packets having the non-zero globally assigned BFD discriminator value in respective Your Discriminator fields.

12. The media of claim 11, wherein the non-zero globally assigned BFD discriminator comprises any 32 bit value that can uniquely identify the target node in the network.

13. The media of claim 11, wherein if the BFD target identifier type is type 1 on an IP network, the non-zero globally assigned BFD discriminator is an IP address of the target node when the network uses IPv4 addresses, and the non-zero globally assigned BFD discriminator is a router ID associated with the target node when the network uses IPv6 addresses.

14. The media of claim 11, wherein if the BFD target identifier type is type 2 on a SR enabled network, the non-zero globally assigned BFD discriminator is a node segment ID associated with the target node.

15. The media of claim 11, wherein the BFD target identifier type is type 3 for executing traceroute operations in the network.

16. An apparatus, comprising:
   a memory element for storing data; and
   a processor, wherein the processor executes instructions associated with the data, wherein the processor and the memory element cooperate, such that the apparatus is configured for:
      determining a BFD target identifier type for communicating in a BFD session in a network environment;
      determining a non-zero globally assigned BFD discriminator value associated with the BFD target identifier type, wherein, if the BFD target identifier type is indicative of executing traceroute operations in the network, the non-zero globally assigned BFD discriminator is an Alert Discriminator reserved by nodes in the network exclusively for BFD traceroute operations;
      populating a Your Discriminator field in a BFD Control Packet with the non-zero globally assigned BFD discriminator value, wherein a My Discriminator field in the BFD Control Packet is populated with a locally assigned BFD Discriminator value; and
      initiating the BFD session by transmitting the BFD Control Packet to a target node in the network, wherein the target node is configured to listen for BFD Control Packets having the non-zero globally assigned BFD discriminator value in respective Your Discriminator fields.

17. The apparatus of claim 16, wherein the non-zero globally assigned BFD discriminator comprises any 32 bit value that can uniquely identify the target node in the network.

18. The apparatus of claim 16, wherein if the BFD target identifier type is type 1 on an IP network, the non-zero globally assigned BFD discriminator is an IP address of the target node when the network uses IPv4 addresses, and the non-zero globally assigned BFD discriminator is a router ID associated with the target node when the network uses IPv6 addresses.

19. The apparatus of claim 16, wherein if the BFD target identifier type is type 2 on a SR enabled network, the non-zero globally assigned BFD discriminator is a node segment ID associated with the target node.

20. The apparatus of claim 16, wherein the BFD target identifier type is type 3 for executing traceroute operations in the network.

* * * * *